(12) United States Patent
Chiappe (10) Patent No.: US 10,497,075 B2
(45) Date of Patent: Dec. 3, 2019

(54) SYSTEM AND METHOD FOR OPTIMIZING HEALTHCARE REMITTANCE PROCESSING

(75) Inventor: Andrea Chiappe, Dallas, TX (US)

(73) Assignee: SYSTEMWARE, INC., Addison, TX (US)

( * ) Notice: Subject to any disclaimer, the term of this patent is extended or adjusted under 35 U.S.C. 154(b) by 889 days.

(21) Appl. No.: 13/189,326

(22) Filed: Jul. 22, 2011

(65) Prior Publication Data

US 2012/0022887 A1 Jan. 26, 2012

Related U.S. Application Data

(60) Provisional application No. 61/366,846, filed on Jul. 22, 2010.

(51) Int. Cl.
*G06Q 50/22* (2018.01)
*G06Q 30/04* (2012.01)

(52) U.S. Cl.
CPC ............ *G06Q 50/22* (2013.01); *G06Q 30/04* (2013.01)

(58) Field of Classification Search
USPC .......................................................... 705/2
See application file for complete search history.

(56) References Cited

U.S. PATENT DOCUMENTS

| | | |
|---|---|---|
| 7,263,493 B1 | 8/2007 | Provost et al. |
| 8,326,653 B2 | 12/2012 | Gottlieb et al. |
| 8,332,238 B1 | 12/2012 | Allen |
| 8,364,498 B2 | 1/2013 | Sohr et al. |
| 2001/0043740 A1* | 11/2001 | Ichikawa et al. ............ 382/176 |
| 2004/0010758 A1* | 1/2004 | Sarkar et al. ................. 715/531 |
| 2007/0033137 A1* | 2/2007 | Provost et al. ................. 705/40 |

* cited by examiner

*Primary Examiner* — Reginald R Reyes
(74) *Attorney, Agent, or Firm* — David W. Carstens; Carstens & Cahoon, LLP (57) ABSTRACT

A system and method for optimizing healthcare remittance processing includes a networked computing device that provides a user interface and access to healthcare claims and remittance data prepared by the system. The user receives a claim file prepared by a healthcare provider and an EOB/EOP prepared by a healthcare payer in response to the claim file. A remittance file is generated from the received data and is validated using automatic and manual means and is indexed against the remitted data. EOB/EOP data is converted to computer readable data in a standardized remittance file format. This transaction information is stored within the database and access to the stored information is provided to a user over a network connected interface.

30 Claims, 10 Drawing Sheets

*Systemware Medical Banking - Internet Explorer provided by Dell*

Logout admin   Help

Home | Tasks | Convert Paper EOBs to 835s

Convert Paper EOBs to 835s   Bank: All Banks ▼   Provider: All Providers ▼   Payer: All Payors ▼

Document — 800

Check Amount: $152.93

Claim #: 2078635129298938   Patient: RYAN EDWARDS
Provider: SWST PEDIATRIC ASSOC                 Received: 6/23/2009
Mailing Address: PO Box 755855 Dallas, TX 75068   Patient Acct # 10217654668S
Place of Service: Test Facility

| Services Received | SERVICE DATE(S) | CHARGE(S) | ADJUSTED AMOUNT | DEDUCT AND/OR COPAY | PAID AMOUNT | MESSAGES | | |
|---|---|---|---|---|---|---|---|---|
| LABORATORY, DIAGNOSTIC | 6/6/2009 | 60.61 | 44.30 | | 16.31 | 97748 | KS | |
| HOSPITAL, PROCEDURE | 5/26/2009 | 79.20 | 3.06 | | 76.14 | L4619 | M6 | |
| HOSPITAL, PROCEDURE | 7/19/2007 | 70.37 | 9.89 | | 60.48 | V5989 | RS | |
| TOTALS | | 210.18 | 57.25 | | 152.93 | | | |

3. EXPLANATION OF MESSAGE CODES — 802

Index Fields | Claims ▼

〈 Claim - 1 of 11 〉

Patient Account:     Mailing
Claim #:             2078635129298938       — 804
Last Name: EDWARDS       First Name: RYAN
Charge Amount: 210.18    Paid Amount: 16.31
Status Code:             Processed as Primary ▼
Filing Code:             Commercial Insurance ▼
Remark Code:             --Choose-- ▼

Notes | Errors — 806

| Description | Value |
|---|---|
| Service Reconciliation Failed | 39.83 |
| Service Reconciliation Failed | 44.17 |
| Claim Reconciliation Failed | -32.62 |
| EOB Reconciliation Failed | 136.62 |

| Message |
|---|
| The Service Charge Minus the Service Adjustments do not Match the Payment Amount. |
| The Service Charge Minus the Service Adjustments do not Match the Payment Amount. |
| The Total of All Claim Service Payments does not match the Claim Paid Amount. |
| The Total Claims Paid Amount does not match the EOB Check Amount. |

Claims — 808

▼ EOB SYSTEMWARE HEALTH PLAN INC | $152.93
  ▼ Claim Number 1 | $210.18
    • Service Number 1 | $60.61
      Service Adjustment Number 1 | $44.30
    ▼ Service Number 2 | $79.20
      Service Adjustment Number 1 | $3.06
    ▼ Service Number 3 | $70.37

Apply   Save

| | File Name | Created | Bank | Provider | Status |
|---|---|---|---|---|---|
| ☑ | RSSEDI83510.0840000268351 5.400300001. | 04/06/2011 02:12 PM | Sample Bank | Demo Provider | Reconciled |
| ☑ | RSSEDI83510.0840000268350 7.400300001. | 04/12/2011 10:42 AM | Sample Bank | Demo Provider | Reconciled |
| ☑ | RSSEDI83510.0840000268352 9.400300001. | 04/21/2011 04:20 PM | Sample Bank | Demo Provider | Reconciled |
| ☐ | RSSEDI83510.0840000268356 1.400300001. | 05/27/2011 11:04 PM | Sample Bank | Demo Provider | Unreconciled |

SYSTEM AND METHOD FOR OPTIMIZING HEALTHCARE REMITTANCE PROCESSING

CROSS-REFERENCE TO RELATED APPLICATIONS

This application claims the benefit of provisional Application No. 61/366,846, filed Jul. 22, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to healthcare payment processing systems and, more specifically, to a medical banking system and method that optimizes healthcare remittance processing.

2. Description of Related Art Including Information Disclosed Under 37 CFR 1.97 and 1.98

Figure 1:
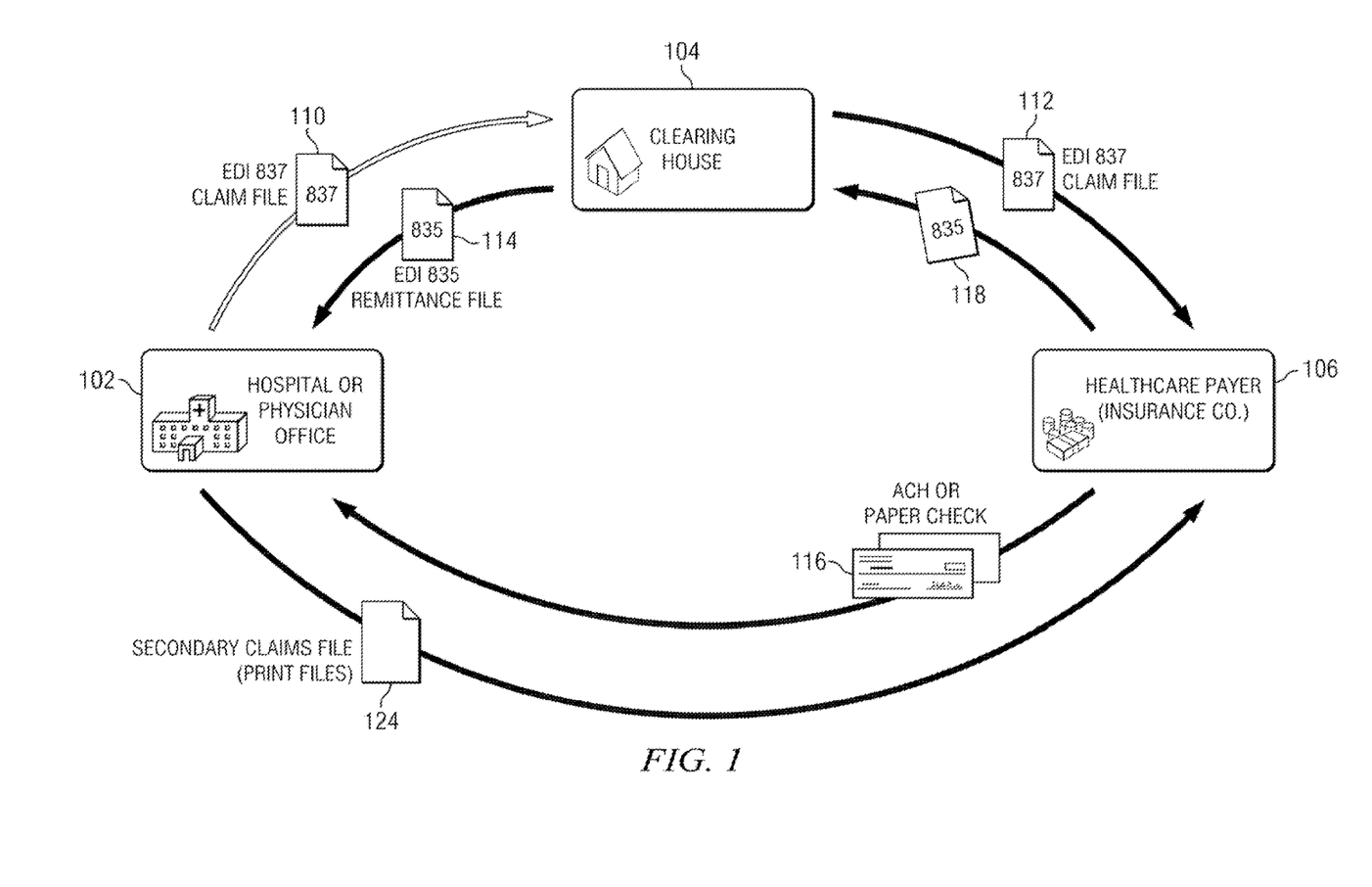
FIG. 1 is a flow diagram depicting the relationships between the healthcare provider, clearing house, and healthcare payer, and the documents created within and exchanged in a typical healthcare remittance processing scenario.

Obtaining payment for healthcare services rendered is an arduous task. In a typical reimbursement scenario as depicted in FIG. 1, a healthcare provider (102) (for example, a doctor, hospital, clinic, or other healthcare professional) provides a healthcare service to a patient with insurance. The provider (102) then prepares and submits a claim form (110) to the patient's health insurance company (106)—often through a healthcare clearing house service (104)—for the services performed. The healthcare payer (106) then considers the claim form (112) in light of the patient's policy coverage and sends a paper explanation of benefits (EOB) or explanation of payments (EOP) document (118) to the provider along with payment (116) of all or a portion of the claims filed. It is then up to the provider (102) to manually enter the EOB or EOP data into an accounting system to track accounts receivable data.

From the healthcare provider's (102) standpoint, processing of an EOB or EOP is quite burdensome and error prone. First, a typical large EOB or EOP may have hundreds of thousands of data points within it to consider. Manually keying the data points from such a file into an accounting system requires an inordinate amount of time and is subject to considerable transcription error. Further, the provider must perform a manual comparison of the claims that were filed to the payments received in order to make an informed decision as to which claims were reimbursed and which claims must be resubmitted. From this determination a secondary claim file (124) containing any unremitted claims may then be prepared and submitted to the payer (106), adding yet another step for the healthcare provider in an already burdensome and costly healthcare reimbursement process.

Accordingly, what is needed is a solution to decrease the overall administrative costs and requirements of the healthcare remittance process. Further, a need exists for a solution to improve the overall accuracy of the remittance process to ensure fair reporting and reimbursement for services provided. The present invention satisfies these needs and others as evident in the following detailed description of the embodiments.

BRIEF SUMMARY OF THE INVENTION

A system, method, and computer software for optimizing healthcare remittance processing, the method steps comprising: accepting an explanation of benefits (EOB) or an explanation of payments (EOP) document, wherein the accepted document contains a plurality of original data points related to the provision of healthcare services rendered by a provider; converting, with a computing device, the original data points to a computer readable format, wherein the conversion process results in computation of a statistical confidence value related to the accuracy of the conversion of each original data point, and wherein any converted data point having an associated confidence value that is below a predetermined threshold value is a low confidence data point; validating each low confidence data point, wherein validation includes manual verification and correction of the low confidence data; and creating a remittance file comprising the validated computer readable data points, wherein the remittance file is in a format suitable for the provider's practice management system.

In another embodiment each original data point comprises numeric or textual data, and if the low confidence data point being validated is numerical data, the method steps include numerically balancing said low confidence data point with the related original data point. Other embodiments allow conversion of the original data points into computer readable data points through performance of optical character recognition (OCR), intelligent character recognition (ICR), bar code recognition (BCR), or optical mark recognition (OMR), and creation of a remittance file that is in the EDI 835 format. Yet another embodiment accepts a primary claim file from the provider and generates a secondary claims file comprising healthcare claims for which remittance has not yet been received, wherein the secondary claims file is based upon a comparison of the provider's bank statement, the remittance file, and the primary claim file. An embodiment also accepts a primary claim file from the provider, wherein the claim file is in the EDI 837 format; and generates a secondary claims file comprising healthcare claims for which remittance has not yet been received, wherein the secondary claims file is based upon a comparison of the provider's bank statement, the remittance file, and the primary claim file. Still other embodiments provide a download queue for the randomly accessible storage of a plurality of remittance files, and for pushing the remittance file to the provider's program management system. A final embodiment creates and stores metadata related to the original data points.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, wherein:

FIG. 8 depicts a screenshot of an embodiment of the user interface utilized for indexing claim and remittance data;

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood. (58,266).

DETAILED DESCRIPTION OF THE INVENTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

As used herein, "EOB" means Explanation of Benefits. This document is provided by the health insurance provider and describes the benefit payments made to a particular patient under his or her healthcare policy with respect to procedures performed by a healthcare provider. For example, the EOB lists details regarding the covered person's healthcare policy in addition to the dates, service code, healthcare provider charges, health plan negotiated charges, copay amounts, payment amounts, and remaining balances.

As used herein, "EOP" means Explanation of Payments. This document is provided by the health insurance provider to the healthcare provider, and describes payment details relating to submitted procedures performed by the doctor for a covered individual. For example, the EOP lists details regarding the patent name and health policy, as well as dates of service for particular procedures performed by the healthcare provider, claim number, amount billed, Medicare allowances, payment amounts, remaining balances, payment codes, and code explanations.

As used herein, "EDI 837" is an adaptation of ANSI 837, the healthcare industry standard that addresses the submission of medical billing and payment transactions. EDI is an abbreviation for Electronic Data Interchange. This standard defines certain patient and procedure information necessary to facilitate medical billing and payment. An EDI 837 file is also considered a "claim file" as that term is used herein.

The term, "EDI 835," as used herein, is an adaptation of ANSI 835, the healthcare industry standard that addresses healthcare claim payment or remittance. This standard defines certain procedure and payment information used to facilitate reconciliation of payment of the submitted claims. The 835 EDI document type is used to make a payment or send an explanation of benefits from a health care insurer to a health care provider. An 835 EDI Health Care Claim Payment/Advice is organized into segment and data elements. A segment contains at least one data element, while each data element contains a data field. Data elements may include data, for example, date, amount paid, and explanation of the payment, identical to a paper health care claim payment. There are an infinite number of possibilities available for including data on such an EDI 835 document. The 835 EDI document is sent from a health care insurer to a health care provider either to make a payment or to send remittance advice, and is sent either directly or through a financial institution. An EDI 835 file is considered a "remittance file" as that term is used herein.

The system of the present invention can be implemented on a networked computing device platform that is capable of local or remote access by a user. For example, the computing device can be a stored program computer such as a desktop, laptop, server, mainframe, or the like, including but not limited to a RISC or CISC processor, a DSP, a programmable logic device or the like, capable of executing program instructions. Further, it is possible that the system may utilize any one or some combination of the aforementioned devices. Choice of hardware and implementation is considered to be within the skill of one of ordinary skill in the art for which the invention applies.

The process steps of the present invention can be implemented in high or low level programming or scripting languages, such as Basic, C, C++, C#, .NET, Jscript, Java, or the like. Further, some combination of programming utilities may be utilized to achieve the process steps of the invention. Choice of programming language and implementation is considered to be within the skill of one of ordinary skill in the art for which the invention applies. Further, the system may include application programming interface (API) call capabilities to allow a provider or payer to access the novel functionality through use of API calls made within a web browser instance, or may be provided in a proprietary format with a graphical user interface as depicted herein.

Figure 2:
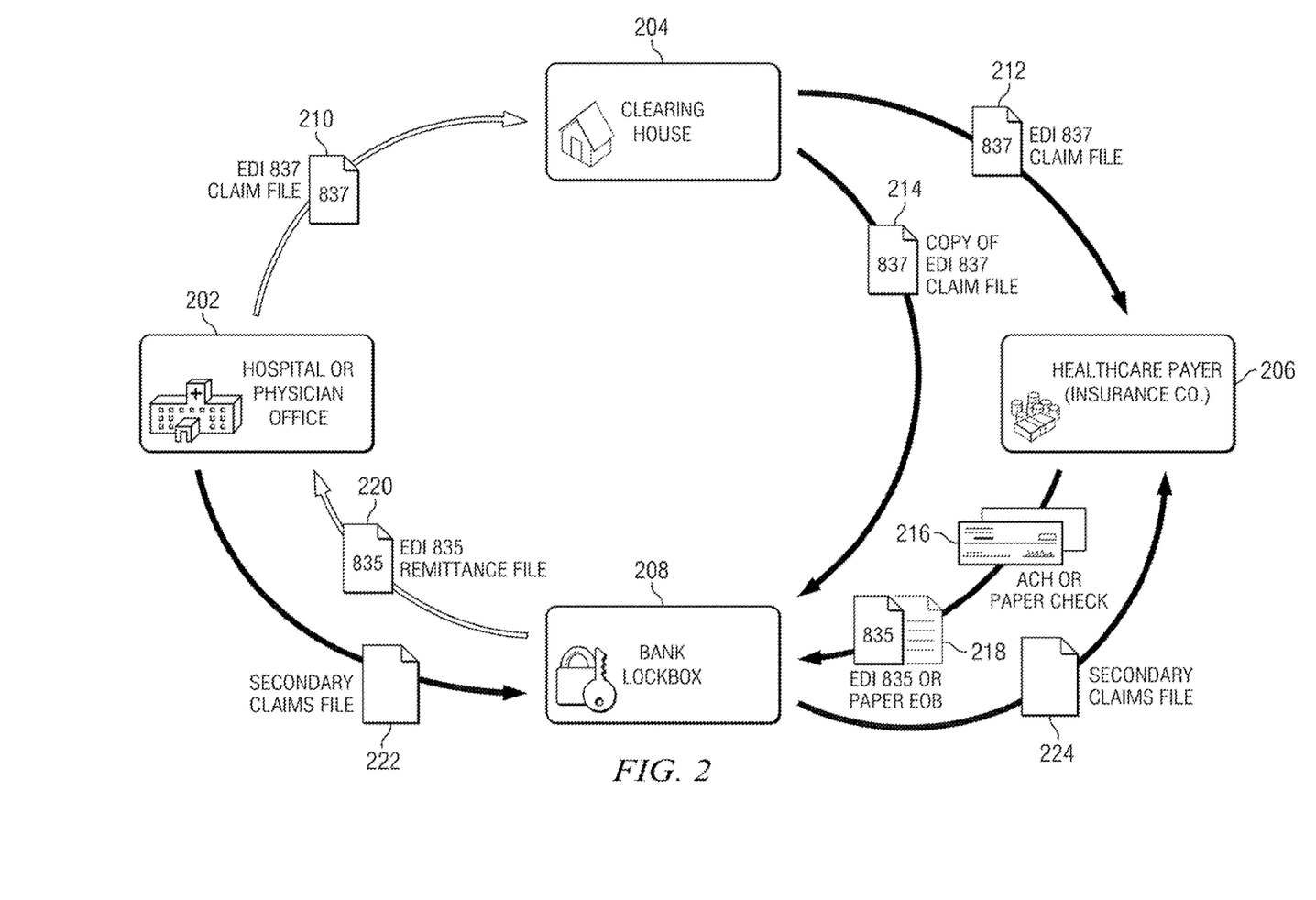
FIG. 2 is a flow diagram depicting the previous relationship and the documents exchanged in an optimized healthcare remittance processing scenario utilizing an embodiment of the present invention.

FIG. 2 is a flow diagram depicting the optimized healthcare remittance processing steps utilizing an embodiment of the present invention. As shown, a healthcare provider (202), after having performed healthcare services for a patient, prepares a claim file (210) to obtain reimbursement from the patient's healthcare payer (206). In this embodiment the provider (202) utilizes a healthcare clearing house (204) to assist with the administrative tasks of billing. The clearing house (204) receives the claim file (210) and forwards a copy (212) to the payer (206) and an additional copy (214) to the provider's medical bank (208) or financial institution. In another embodiment, the clearing house (204) is not utilized and the provider (202) submits the aforementioned copies directly to the payer (206) and bank (208).

Once the payer (206) receives the claim file (210), a review of the patient's insurance coverage is conducted. Based upon the coverage, the payer (206) generates an EOB file (218) presenting data regarding the benefits that apply for the patient's service. This EOB file (218) also informs the provider (202) of the level of coverage that is available, the rates that the payer (206) is willing to remit for each of the provider's submitted claims, and the amount of any remittance and reasons therefor.

In addition to the EOB file (218) the payer (206) will, in certain situations, remit payment directly to the provider (202). However, in this instance, the provider (202) utilizes a medical bank service (208) to accept payment from the payer (206). The EOB (218) and payment (216) are received by the bank (208) and the provider's (202) account is credited. The medical bank then converts the EOB (218) data points, using the present invention, into a standardized electronic remittance file (220) for the provider's (202) review. The EOB data (218) is validated by direct comparison with the claim file data (214) and provider banking statements. The provider (202) then receives the generated remittance file (220) and determines if any claims remain unpaid. If there are remaining claims, the provider generates a secondary claim file (222) that is presented to the bank (208), which is then forwarded (224) to the payer (206). In another embodiment, the secondary claims file (224) is automatically generated by the bank (208) based upon data obtained from the EOB file (218) and claim file (214) in addition to the provider's banking statement.

Figure 3:
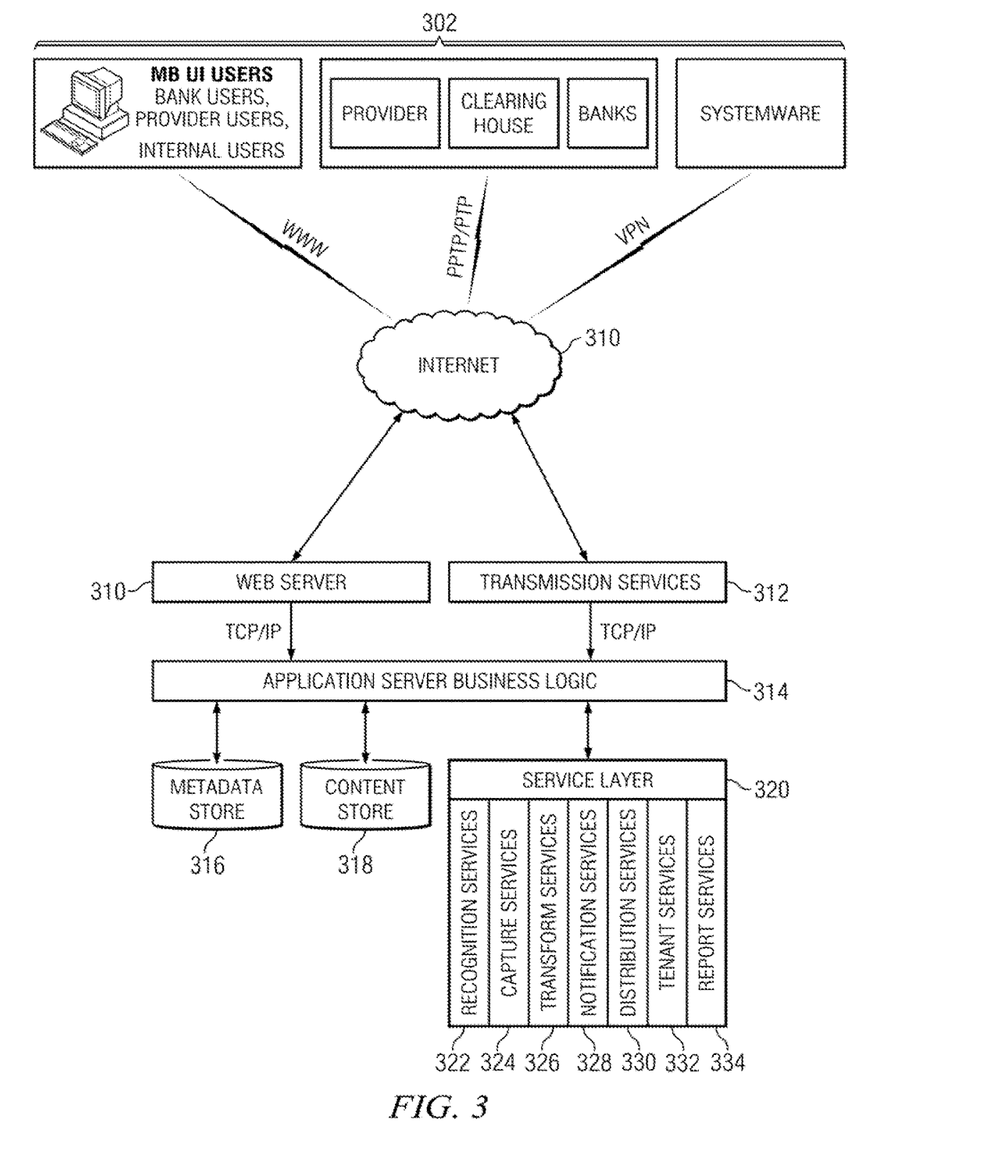
FIG. 3 is a system block diagram depicting some of the major components of an embodiment of the healthcare remittance processing system of the present invention.

FIG. 3 depicts a block diagram of some of the major system components of an embodiment of the healthcare remittance processing system. As shown, users (302) access the system via secured or unsecured connections over the Internet (310) or other computer network (for example, PAN, LAN, MAN, or the like). A web server (310) allows a user (302) to make API calls to elicit desired system functionality through the application business logic layer (314), which abstracts the functionality of the underlying service layer (320).

Network access to the system can be accomplished securely in a number of ways. For example, it is possible to utilize an HTML Internet browser to access the user data via a Web server (310) over the Internet. Yet another method is through use of a private network or a virtual private network that may utilize the Internet or intranet connections. Such access can also be through an Internet browser that renders HTML pages or with a dedicated graphical user interface (GUI) tailored to the specific user's access privileges.

The service layer further abstracts the basic functional blocks of the system. In this embodiment, the services provided include recognition services (322), document capture services (324), data transformation services (326), user notification services (328), distribution services (330), tenant services (332), and report services (334). Data upon which the system acts is stored in an attached (direct or network) content database (318) and metadata database (316). Metadata, which is essentially data about data, is stored to improve the efficiency of search for and storage of content data. The functional service layers access the data through the service layer (320) and/or application server business logic layer (314).

The recognition services (322) include the systems optical character recognition (OCR), intelligent character recognition (ICR), bar code recognition (BCR), optical mark recognition (OMR) capabilities and the like, in addition to allowing manual user validation and manipulation of data. OCR utilizes known algorithms for recognition of printed text into computer readable format, whereas ICR utilizes known algorithms that allow primarily for the recognition of handwritten characters and their conversion to a computer readable format. References herein to One of ordinary skill in the art will appreciate that such recognition technologies are well understood and mature technologies.

The capture services (324) provides capabilities for document capture. For example, optical scanners, monitored folders, electronic upload, and digital document images may be obtained utilizing the functionality provided within this layer.

The transform services (326) provide the ability to transform documents from one standard document format to another. For example this layer provides functionality for transforming data points in an EOB image file to a standardized EDI 835 file.

The notification services (328) include functionality that generates automatic notification of system users and other related systems when various document or system events occur.

The distribution services (330) layer provides for the distribution of documents to users or print queues on a scheduled or event-triggered basis. For example secondary claims can be distributed to a print queue when they occur.

The tenant services (332) include The security layer used to appropriately apply rights, roles, and access rights to a specific tenant in a SaaS model. This layer also provides the functionality used to establish new tenants and tenant billing codes in the system. For example, the tenant may be a bank and provider.

The report services (334) provide reporting functionality with regard to system operation. For example, auditing reports may be generated regarding system efficiency (for example, number of documents processed, document throughput figures, OCR confidence averages, account balances, etc.). The reporting service is responsible additionally for compliance reports such as HIPAA reports and additionally billing transaction reports are created for distribution within this layer.

As previously mentioned, the EOB or EOP file can contain thousands of data points relevant to the provider's claim for remittance, with each data point containing textual data or numeric data, or a combination of textual and numeric data. In fact, some large EOBs for multiple procedures can include some 200,000 or more data points. To further complicate review of this information, the EOB is not standardized and each healthcare payer utilizes a slightly different format. The present embodiment handles this problem by scanning the EOB form and utilizing OCR or ICR to obtain computer readable data. During the OCR or ICR process certain data is often encountered that is of poor image quality and incapable of recognition. Statistics are obtained during the OCR or ICR process to indicate a confidence value related to the potential accuracy of the character recognition process. All "low confidence" data is marked for subsequent manual review. Although an EOB file is specifically mentioned, similar processing occurs when an EOP file is received.

Figure 4:
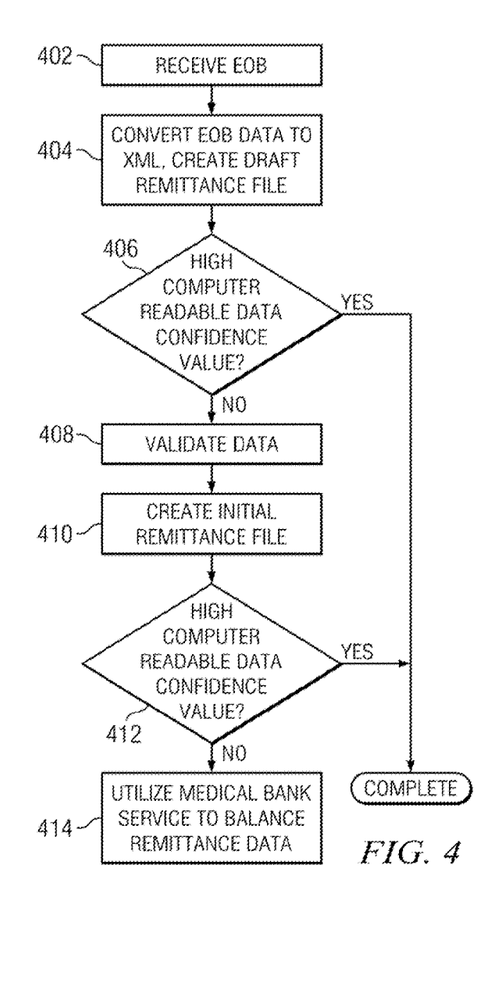
FIG. 4 is a block diagram depicting the steps taken by the system of the present invention.

FIG. 4 depicts a flow diagram of processing steps taken in the recognition services of the present embodiment, in converting an EOB or EOP file to an electronic remittance file and validating the resulting data. Upon receipt of the EOB (402), the system performs OCR on the data. During the OCR process most of the scanned data will be readily convertible into computer readable data (i.e., "high confidence" data). Because OCR and ICR each perform statistical analysis of the image data processed, each of the data points receives a confidence value, with a high value representing a high likelihood that the computer readable data accurately reflects the original image data. Further, data points recognized as containing numeric information are converted to numbers upon which mathematical algorithms may be applied.

Low confidence values indicate computer readable data that may not accurately reflect the original image data. System conversion accuracy may be varied depending on the threshold assigned to the high/low confidence value ranges. Auditing of the system using a known exemplar document, wherein conversion of the data points on the exemplar document is predictable and verifiable, may be performed to determine the optimal confidence threshold value.

All computer readable data is converted into an XML format (404). From this XML data, a draft remittance file is generated. If all of the computer readable data has a high confidence value (406), the remittance file is complete and processing stops. However, if data having a low confidence value is present (406), then validation of the low confidence data must occur (408).

Figure 5:
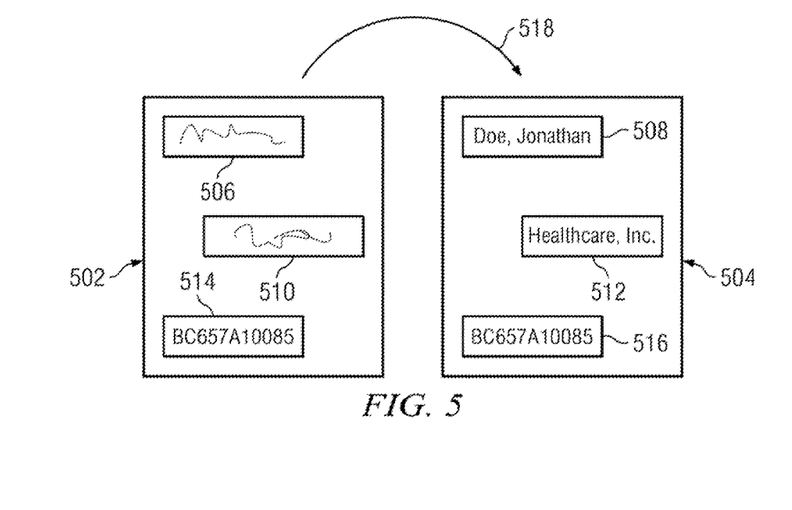
FIG. 5 is a depiction of the preparation of an EDI 835 remittance file during the validation phase of the embodiment.

Validation (408) is the process whereby the remittance file data is manually reviewed. To reduce overall processing time, only the low confidence data is considered. FIG. 5 depicts a portion of a remittance file that results after the initial OCR or ICR processing and validation. As shown, the resulting OCR document (502) accurately converted the number "BC657A 10085"(514), assigning a high confidence value to this data. Low confidence data is also shown (506 and 510). Following validation, a final remittance file (504) is generated (518) having full computer readable data (508, 512, and 516). Although the present embodiment considers only low confidence data for review during validation, if full accuracy is desired a manual review may be conducted on all data regardless of the confidence.

Turning again to FIG. 4, following the initial validation phase (408) an initial remittance file (410) is created and another validation is conducted, the resulting remittance file is considered complete if no further low confidence data discrepancies are noted (412). If discrepancies are noted (412), the medical bank service (414) balances the remittance data.

Figure 6:
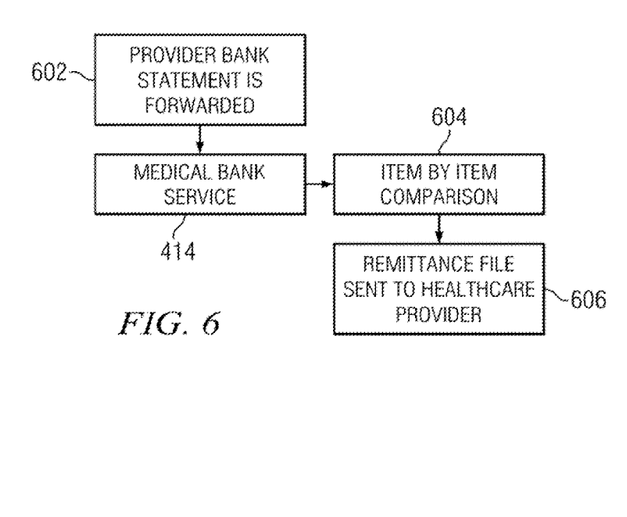
FIG. 6 is a block diagram depicting the steps taken by the system in reconciling the bank statement with the validated EDI 835 file.

FIG. 6 depicts the steps taken by the medical bank service (414) when balancing the remittance file. If any unremitted claims remain, a secondary claim file is generated for the unremitted claims and the banking service submits this to the payer. As shown, the Medical Bank service (414) receives the provider's bank statement (602). An item by item comparison is performed to verify each of the data points present in the remittance file (604). If further discrepancies are noted, the remittance file is corrected and a copy is sent to the healthcare provider (606).

Figure 7:
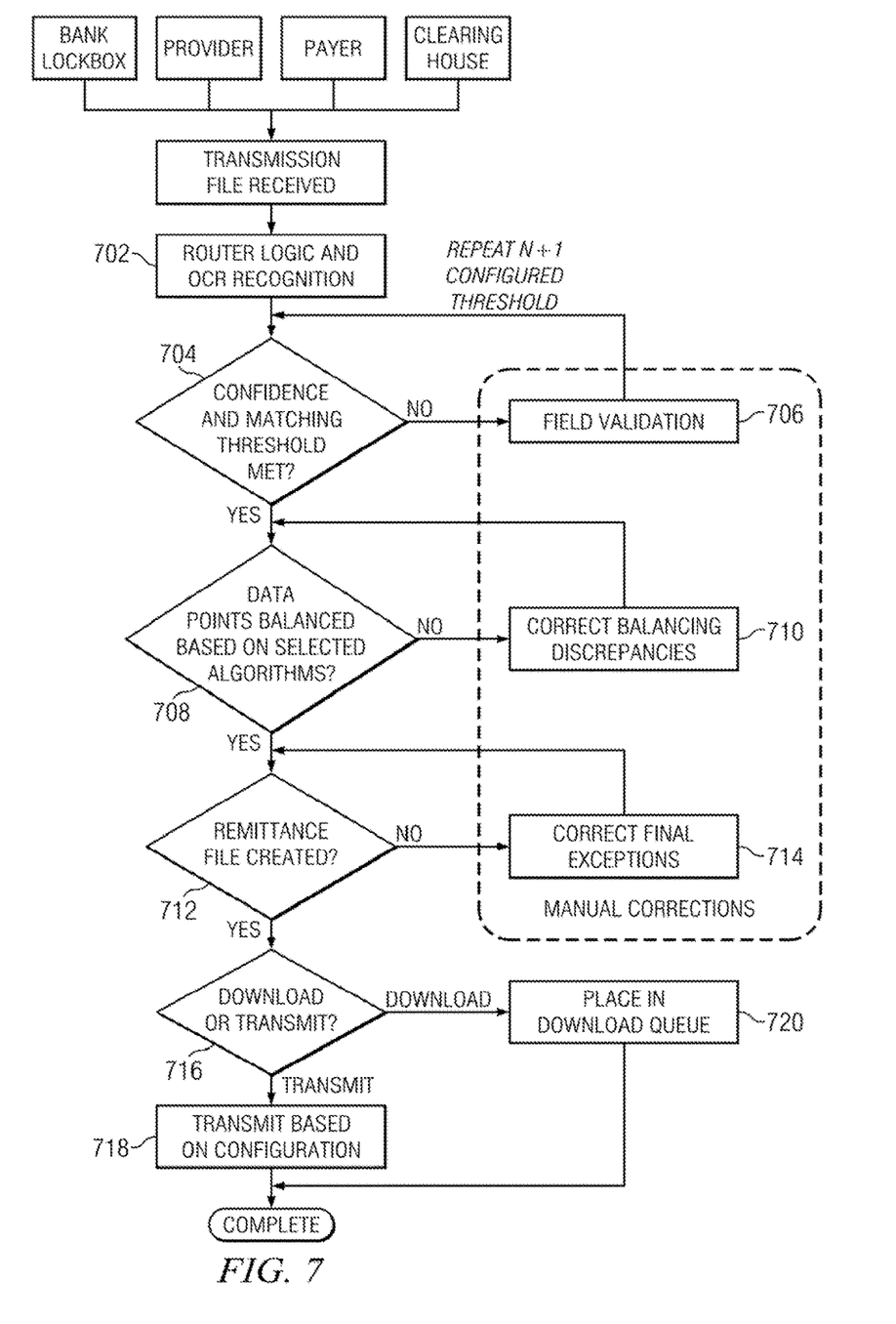
FIG. 7 is a flow diagram depicting validation step details taken in an embodiment of the Medical Banking queue of the present invention.

FIG. 7 depicts a flow diagram of the validation process. Upon initial OCR (or ICR) processing of the EOB and/or EOP (702), the remittance file is examined field-by-field for low confidence data (704). Each field having a low confidence value is manually validated (706) until the matching threshold is met (704). Next, each data point is considered utilizing selected balancing algorithms (708). If balancing discrepancies are present, such discrepancies are corrected (710). Next, if no exceptions still exist, the remittance file is created (712). If exceptions still exist, then the final exceptions are corrected (714) and the remittance file is created (712). Once created, a determination is made as to whether the remittance file should be downloaded or transmitted to the provider (716). If transmission of the file is desired, the system reads the provider configuration data to determine which transmission methods are appropriate (718). For example, a provider may request receipt of the remittance file as an email attachment. If download of the remittance file is appropriate, the file is placed in the download queue (720). From here the document is downloaded to the provider using the appropriate means (i.e., FTP, HTTP, etc.). Ultimately, the goal is to prepare for the provider a common computer readable remittance file from received EOB and/or EOP files that may vary in format depending on the payer.

FIG. 8 depicts a screenshot of the user interface (800) utilized for indexing and manipulating the remittance file data with claim and bank statement information. The operator is presented with a scanned image of the EOB/EOP (802). Beneath the image is a listing of errors discovered when comparing the computer readable remittance file data with the bank statement (806). For example, an error entry is provided if the remittance total amount does not match the claim amount paid. Claims information is presented in a window (808) to the right of the error window. The indexing window (804) allows the operator is allowed to modify data points to correct discrepancies noted by the error (806) and claims (808) window in view of the image data (802). As corrections are made, the corresponding error message is automatically removed from the error listing (806).

Figure 9:
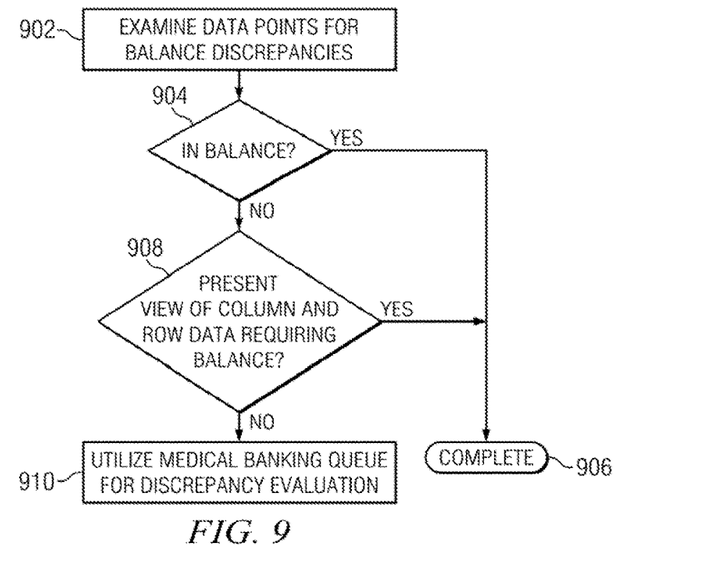
FIG. 9 depicts a flow diagram of the steps taken by the system in verifying and correcting the recognized EOB data in an embodiment of the present invention.

FIG. 9 depicts a flow diagram of the balancing process. Upon completion of OCR (or ICR) and field validation, the resulting data points are examined for balance discrepancies (902). This is performed by applying the chosen mathematical algorithms to the EOB. If the EOB is in balance (904) the system completes the balancing step (906). However, if a discrepancy exists the user is presented with a view of the column and row that is out of balance (908). As shown, the system highlights (or draws attention to) the entries that are out of balance by causing a contrasting line or color shading to appear over the unbalanced entries. Once the user keys in the corrected data, the system automatically evaluates if it is balanced and, if it is so, the correction process is complete (906). If not, processing moves to the more detailed medical banking queue for a different user to evaluate (910) (see discussion of FIG. 7). The present embodiment allows users to select which balancing algorithms, or combination thereof, are to be applied to the data in a given EOB.

With regard to balancing algorithms, the system is flexible and allows creation of mathematical algorithms that function on cell data such as that with spreadsheets. For example, the following algorithm might be used to verify the balance of column structured data: "[OCR Row 1 Column 1]+[OCR Row 1 Column n+1]=[OCR Row 1 Total Column]," while the following algorithm might be used to verify the balance of row structured data: "[OCR Row 1 Column 1]+[OCR Row n+1 Column 1]=[OCR Column 1 Total Row]."

Figure 10:
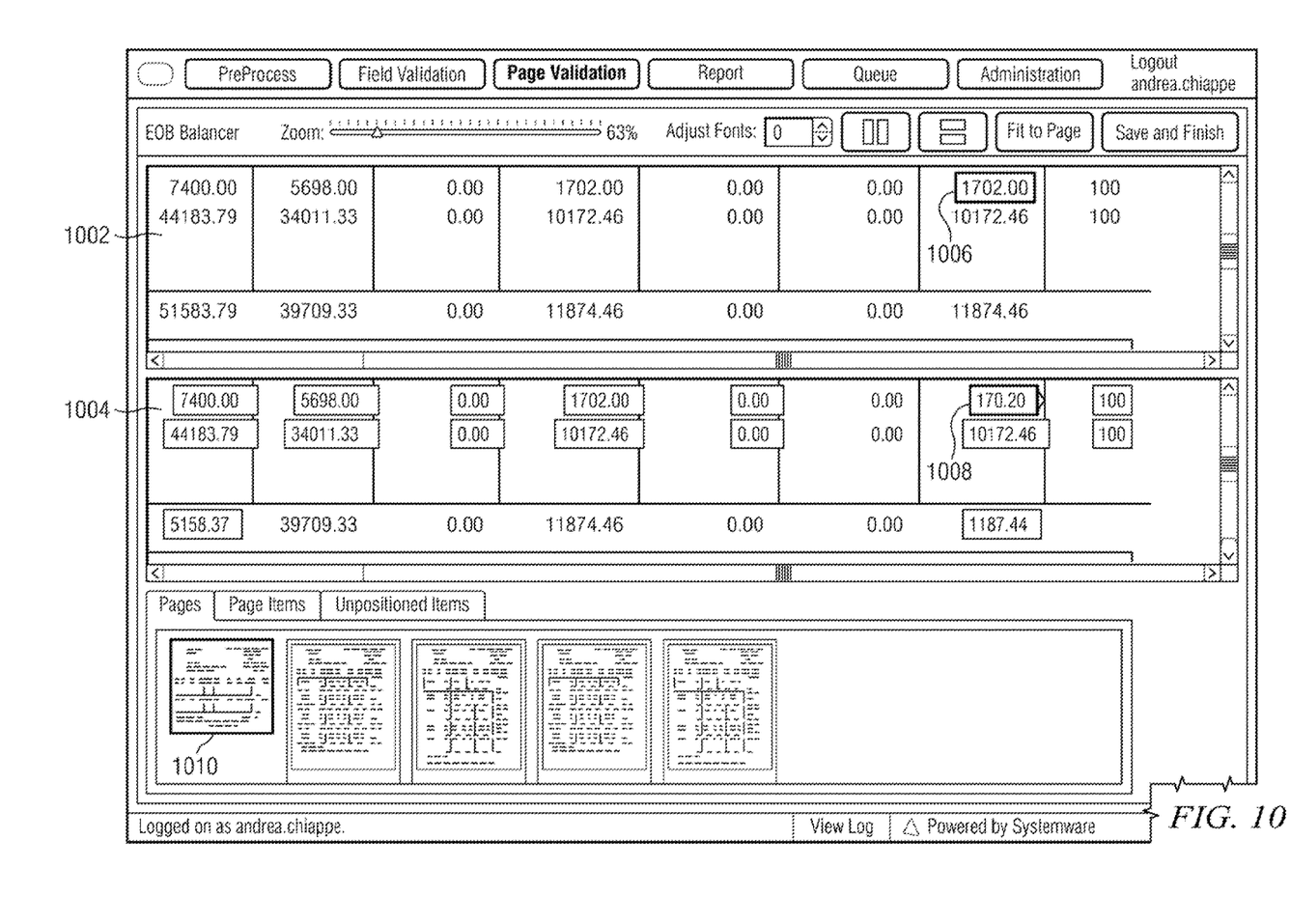
FIG. 10 depicts a screenshot of an embodiment of the user interface for verifying and correcting errors that have resulted from poor optical or intelligent character recognition or manual keying of EOB data.

FIG. 10 depicts a screenshot of an embodiment the user interface for the balancing process, for verifying and correcting errors that have resulted from poor OCR, ICR, or manual keying of EOB data. The interface displays for the user the actual page image (1002) on top of the corresponding recognized data (1004) in spreadsheet format, which contains recognized text field overlays of the recognized EOB data points. The system highlights any row/column EOB data that is out of balance (1006) as determined by the desired balancing algorithm. In this case the user can key in the correction (1008) and then proceed to review and processing of any additional balancing errors. Thumbnails of the actual EOB page images are provided (1010), allowing the user to select the desired EOB page to review.

Figure 11:
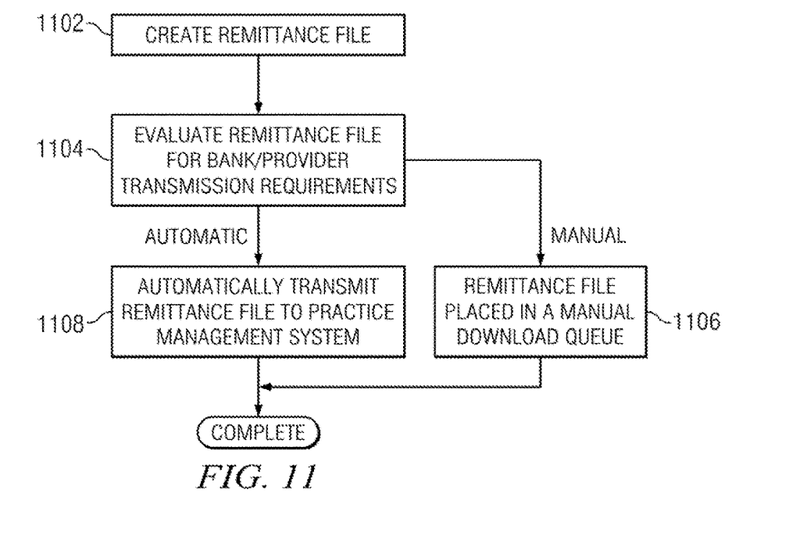
FIG. 11 depicts a flow diagram of the steps taken by the system to offer for download or transmit the resulting remittance files.

FIG. 11 depicts a screenshot of an embodiment of the user interface for downloading remittance files from the download queue. As depicted, once a remittance file has been created (1102), the remittance file is evaluated (1104). The system then determines whether the bank/provider requires remittance files to be placed in the manual download queue (1303) or if the bank/provider requires remittance files to be automatically transmitted to their medical practice management system (1304) software. For example, if automatic transfer is desired, the generated remittance file is pushed automatically to the provider's practice management system. One of ordinary skill will appreciate that the features and functionality of a medical practice management system are well known in the industry. In the manual download queue, the file remains available until the bank/provider initiates the download.

Figure 12:
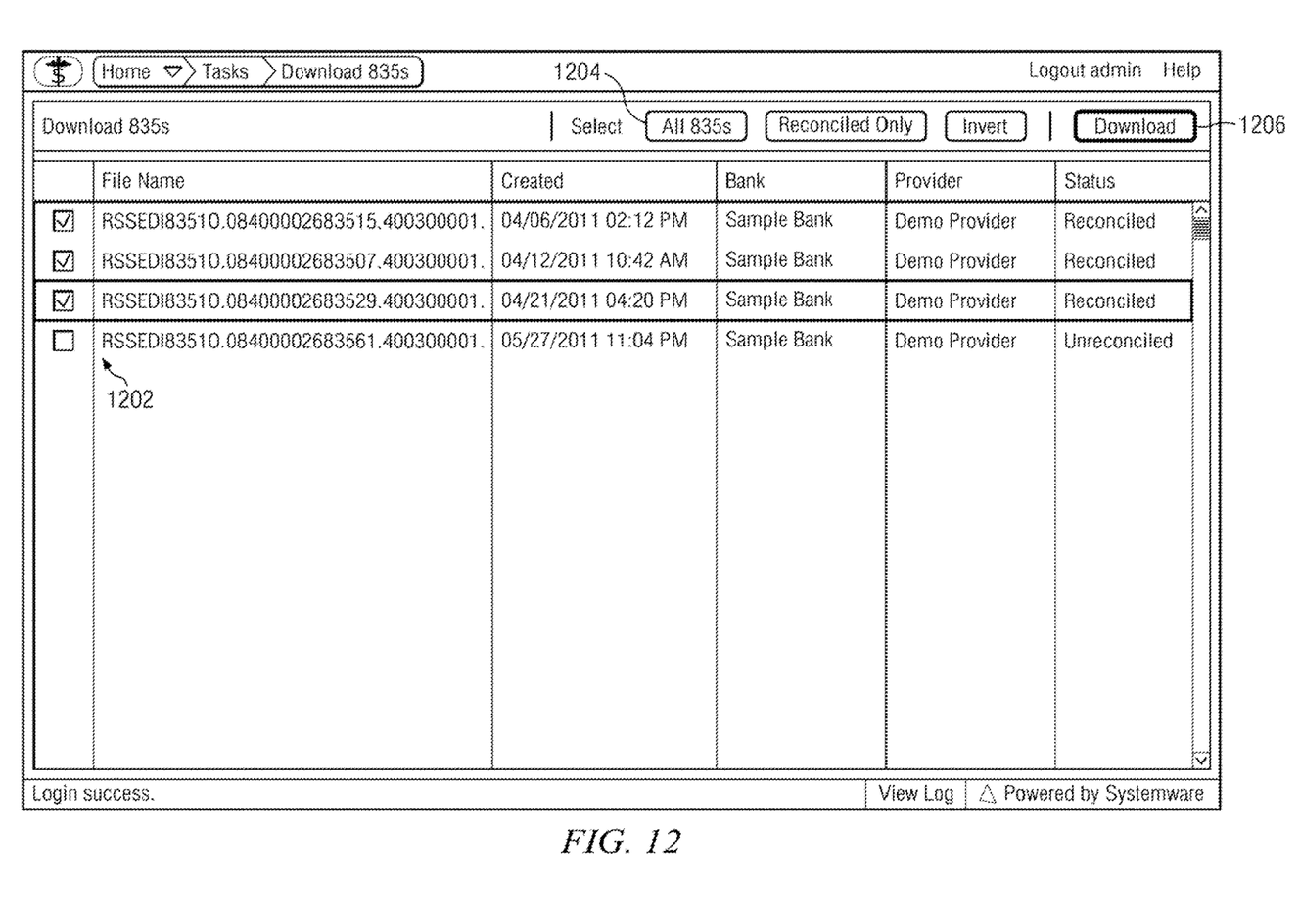
FIG. 12 depicts a screenshot of an embodiment of the user interface for downloading remittance files from the download queue.

FIG. 12 depicts a screenshot of an embodiment of the user interface for downloading remittance files from the download queue. As shown, the user may select individual remittance files to download (1202) or may download at once all remittance files that are available (2104). Selected remittance files may be downloaded (1206) to the user's local computer system as a compressed bundle of remittances for subsequent decompression and extraction.

Figure 13:
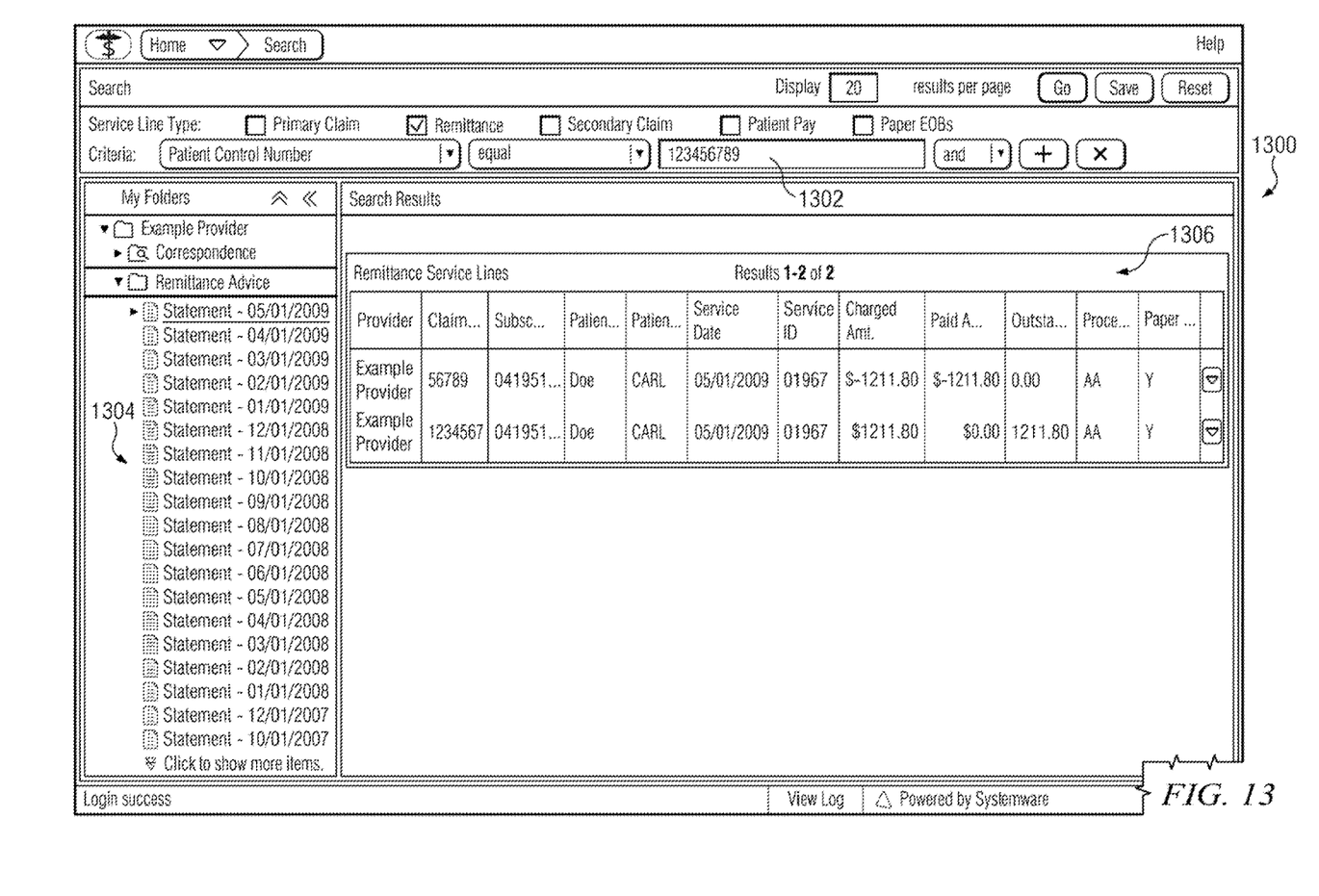
FIG. 13 depicts a screenshot of an embodiment of the user interface for accessing processed claim and remittance data.

Once the medical bank service has received the claims file, EOB/EOP and payment, and has generated the remittance file, this information is stored within a computer content store database for future reference. As mentioned previously, this embodiment utilizes one or more computer databases to retain transactional data for access by users via a network interface such as a custom GUI, HTML browser, or the like. FIG. 13 depicts a typical user GUI for accessing and reviewing claim, remittance, and payment information (1300). In the present embodiment, claim, remittance, and payment information is tied to a patient by a patient control number (PCN) (1302). Once entered into the GUI, the PCN causes the available documents to be displayed in a folder format (1304) for selection by the user. If a particular document is selected, the results are displayed (1306). All information related to the user is made available by the system. For example, if the user is the healthcare provider he or she may review an image of the received EOB/EOP file, claim file, remittance file, secondary claim file, and any other document involved in the claim remittance transaction process, and may print copies or run reports on particular details related with the information.

In addition to content data, metadata concerning the content is also created during processing and stored for subsequent retrieval. Metadata are unique tags and indexes applied to a document to aid in searching for document or document content, and to ensure a unique document is returned. Metadata is also used by the system for semantic searching of documents based on document characteristics. Further, this metadata may be utilized to track certain characteristics of each provider, payer, and/or bank to allow targeting of additional specific services to each. For example, metadata may be collected regarding provider access characteristics, and a review of the metadata may indicate which providers would benefit from ancillary services that the bank may offer.

As indicated above, aspects of this invention pertain to specific "method functions" implementable through various computer systems. In an alternate embodiment, the invention may be implemented as a computer program product for use with a computer system. Those skilled in the art should readily appreciate that programs defining the functions of the present invention can be delivered to a computer in many forms, which include, but are not limited to: (a) information permanently stored on non-writeable storage media (e.g. read only memory devices within a computer such as ROMs or CD-ROM disks readable only by a computer I/O attachment); (b) information alterably stored on writeable storage media (e.g. floppy disks and hard drives); or (c) information conveyed to a computer through communication media, such as a local area network, a telephone network, or a public network like the Internet. It should be understood, therefore, that such media, when carrying computer readable instructions that direct the method functions of the present invention, represent alternate embodiments of the present invention.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

I claim:

1. A method for optimizing healthcare remittance processing comprising:

accepting a scanned image of a paper explanation of benefits (EOB) or a paper explanation of payments (EOP) document, wherein the scanned image contains a plurality of original data points related to the provision of healthcare services rendered by a provider;

converting, with a computing device, the original data points to a computer readable format, wherein the conversion process results in computation of a statistical confidence value related to the accuracy of the conversion of each original data point, determining an optimal confidence threshold value with an exemplar document, wherein conversion of data points of the exemplar document comprises predictable and verifiable data points and wherein any converted data point having an associated confidence value that is below the optimal confidence threshold value is a low confidence data point;

applying balancing checks, with the computing device, to check for unbalanced entries in the converted data points, wherein the balancing checks compute balances in rows and columns of the original data points;

providing a user interface that comprises a first view adjacent to a second view, wherein the first view displays the scanned image of the paper EOB or paper EOP document, and wherein the second view displays a spreadsheet comprising one or more recognized text field overlays of the converted data points;

accepting, with the user interface, manual validation instructions from the user to verify and correct low confidence data, wherein the first view of the user interface displays the scanned image of the paper EOB or paper EOP document, and wherein the second view displays the converted data points;

presenting, with the user interface, the unbalanced entries to a user, wherein the unbalanced entries are highlighted to enable manual balancing and correction by the user;

accepting, with the user interface, manual balancing and correcting instructions from the user to correct the unbalanced entries; and creating, with the computing device, a remittance file comprising the validated computer readable data points, wherein the remittance file is in a format suitable for the provider's practice management system;

evaluating, with the computing device, whether the user selected one of automatic transmission of the remittance file and manual transmission of the remittance file.

2. The method of claim 1, wherein each original data point comprises numeric or textual data.

3. The method of claim 1, wherein each original data point comprises numeric or textual data, the method steps further comprising:
if the low confidence data point being validated is numerical data, numerically balancing said low confidence data point with the related original data point.

4. The method of claim 1 wherein the conversion of the original data points into computer readable data points is through performance of optical character recognition (OCR), intelligent character recognition (ICR), bar code recognition (BCR), or optical mark recognition (OMR).

5. The method of claim 1 wherein the remittance file is in the EDI 835 format.

6. The method of claim 1, the method steps further comprising:
accepting a primary claim file from the provider; and
generating a secondary claims file comprising healthcare claims for which remittance has not yet been received, wherein the secondary claims file is based upon a comparison of the provider's bank statement, the remittance file, and the primary claim file.

7. The method of claim 1, wherein the remittance file is in EDI 835 format, the method steps further comprising:
accepting a primary claim file from the provider, wherein the claim file is in the EDI 837 format; and
generating a secondary claims file comprising healthcare claims for which remittance has not yet been received, wherein the secondary claims file is based upon a comparison of the provider's bank statement, the remittance file, and the primary claim file.

8. The method of claim 1, the method steps further comprising:
providing a download queue for the randomly accessible storage of a plurality of remittance files.

9. The method of claim 1, the method steps further comprising:
pushing the remittance file to the provider's program management system.

10. The method of claim 1, the method steps further comprising:
creating and storing metadata related to the original data points.

11. A computer software program embodied in a non-transitory computer readable medium, the program including machine-readable instructions executable by a computer processor to perform a method for optimizing healthcare remittance processing comprising:
accepting a scanned image of a paper explanation of benefits (EOB) or a paper explanation of payments (EOP) document, wherein the scanned image contains a plurality of original data points related to the provision of healthcare services rendered by a provider;
converting the original data points to a computer readable format, wherein the conversion process results in computation of a statistical confidence value related to the accuracy of the conversion of each original data point;
determining an optimal confidence threshold value with an exemplar document, wherein conversion of data points of the exemplar document comprises predictable and verifiable data points and wherein any converted data point having an associated confidence value that is below the optimal confidence threshold value is a low confidence data point;
providing a user interface for validating each low confidence data point, wherein the user interface comprises a first view adjacent to a second view, the first view displaying the accepted scanned image of the paper EOB or paper EOP document, and the second view displaying a spreadsheet comprising one or more recognized text field overlays of the converted data points;
accepting, with the user interface, manual validation instructions from the user to verify and correct low confidence data, wherein the first view of the user interface displays the scanned image of the paper EOB or paper EOP document, and wherein the second view displays the converted data points;
applying balancing checks, with the computer processor, to check for unbalanced entries in the converted data points, wherein the balancing checks compute balances in rows and columns of the original data points;
presenting, with the user interface, the unbalanced entries to a user, wherein the unbalanced entries are highlighted to enable manual balancing and correction by the user;
accepting, with the user interface, manual balancing and correcting instructions from the user to correct the unbalanced entries; and
creating, with the computer processor, a remittance file comprising the validated computer readable data points, wherein the remittance file is in a format suitable for the provider's practice management system;
evaluating, with the computing device, whether the user selected one of automatic transmission of the remittance file and manual transmission of the remittance file.

12. The computer software program of claim 11, wherein each original data point comprises numeric or textual data.

13. The computer software program of claim 11, wherein each original data point comprises numeric or textual data, the program steps further comprising:

if the low confidence data point being validated is numerical data that is not balanced with the related original data point, highlighting the unbalanced numeric data points; and allowing balancing of the unbalanced numeric data point through the user interface.

14. The computer software program of claim 11, the program steps further comprising:

Converting the original data points into computer readable data points through performance of optical character recognition (OCR), intelligent character recognition (ICR), bar code recognition (BCR), or optical mark recognition (OMR) upon the original data points.

15. The computer software program of claim 11 wherein the remittance file is in the EDI 835 format.

16. The computer software program of claim 11, the program steps further comprising:

accepting a primary claim file and bank statement from the provider; and generating a secondary claims file comprising healthcare claims for which remittance has not yet been received, wherein the secondary claims file is based upon a comparison of the provider's bank statement, the remittance file, and the primary claim file.

17. The computer software program of claim 11, wherein the remittance file is in EDI 835 format, the program steps further comprising:

accepting a primary claim file and a bank statement from the provider, wherein the claim file is in the EDI 837 format; and generating a secondary claims file comprising healthcare claims for which remittance has not yet been received, wherein the secondary claims file is based upon a comparison of the provider's bank statement, the remittance file, and the primary claim file.

18. The computer software program of claim 11, the program steps further comprising:

providing a download queue for the randomly accessible storage of a plurality of remittance files.

19. The computer software program of claim 11, the program steps further comprising:

pushing the remittance file to the provider's program management system.

20. The computer software program of claim 11, the program steps further comprising:

creating and storing metadata related to the original data points.

21. A system for optimizing healthcare remittance processing comprising a computing device capable of executing stored program instructions comprising:

accepting a scanned image of a paper explanation of benefits (EOB) or a paper explanation of payments (EOP) document, wherein the scanned image contains a plurality of original data points related to the provision of healthcare services rendered by a provider;

converting the original data points to a computer readable format, wherein the conversion process results in computation of a statistical confidence value related to the accuracy of the conversion of each original data point, determining an optimal confidence threshold value with an exemplar document, wherein conversion of data points of the exemplar document comprises predictable and verifiable data points and wherein any converted data point having an associated confidence value that is below the optimal confidence threshold value is a low confidence data point;

providing a user interface for validating each low confidence data point, wherein the user interface comprises a first view adjacent to a second view, the first view displaying the scanned image of the paper EOB or paper EOP document, and the second view displaying a spreadsheet comprising one or more recognized text field overlays of the converted data points;

accepting, with the user interface, manual validation instructions from the user to verify and correct low confidence data; wherein the first view of the user interface displays the scanned image of the paper EOB or paper EOP document, and wherein the second view displays the converted data points;

applying balancing checks, with the computing device, to check for unbalanced entries in the converted data points, wherein the balancing checks compute balances in rows and columns of the original data points;

presenting, with the user interface, the unbalanced entries to a user, wherein the unbalanced entries are highlighted to enable manual balancing and correction by the user;

accepting, with the user interface, manual balancing and correcting instructions from the user to correct the unbalanced entries; and creating, with the computing device, a remittance file comprising the validated computer readable data points, wherein the remittance file is in a format suitable for the provider's practice management system;

evaluating, with the computing device, whether the user selected one of automatic transmission of the remittance file and manual transmission of the remittance file.

22. The system of claim 21, wherein each original data point comprises numeric or textual data.

23. The system of claim 21, wherein each original data point comprises numeric or textual data, the stored program instructions further comprising:

if the low confidence data point being validated is numerical data that is not balanced with the related original data point, highlighting the unbalanced numeric data points; and allowing balancing of the unbalanced numeric data point through the user interface.

24. The system of claim 21, the stored program instructions further comprising:

converting the original data points into computer readable data points through performance of optical character recognition (OCR), intelligent character recognition (ICR), bar code recognition (BCR), or optical mark recognition (OMR) upon the original data points.

25. The system of claim 21 wherein the remittance file is in the EDI 835 format.

26. The system of claim 21, the stored program instructions further comprising:

accepting a primary Maim file and bank statement from the provider; and generating a secondary claims file comprising healthcare claims for which remittance has not yet been received, wherein the secondary claims file is based upon a comparison of the provider's hank statement, the remittance file, and the primary claim file.

27. The system of claim 21, wherein the remittance file is in EDI 835 format, the stored program instructions further comprising:

accepting a primary claim file and a bank statement from the provider, wherein the claim file is in the EDI 837 format; and generating a secondary claims file comprising healthcare claims for which remittance has not yet been received, wherein the secondary claims file is based upon a comparison of the provider's bank statement, the remittance file, and the primary claim file.

28. The system of claim 21, the stored program instructions further comprising:
providing a download queue for the randomly accessible storage of a plurality of remittance fifes.

29. The system of claim 21, the stored program instructions further comprising:
pushing the remittance file to the provider's program management system.

30. The system of claim 21, the stored program instructions further comprising:
creating and storing metadata related to the original data points.

* * * * *